(12) United States Patent
Larsen

(10) Patent No.: US 7,403,917 B1
(45) Date of Patent: Jul. 22, 2008

(54) RECONCILING COMBINATIONS OF TRANSACTIONS

(75) Inventor: David R. Larsen, San Jose, CA (US)

(73) Assignee: Intuit Inc., Mountain View, CA (US)

( * ) Notice: Subject to any disclaimer, the term of this patent is extended or adjusted under 35 U.S.C. 154(b) by 0 days.

(21) Appl. No.: 09/534,201

(22) Filed: Mar. 24, 2000

(51) Int. Cl.
G07F 19/00 (2006.01)
G06Q 40/00 (2006.01)

(52) U.S. Cl. .............................. 705/33; 705/30; 705/35

(58) Field of Classification Search .................... 705/33
See application file for complete search history.

(56) References Cited

U.S. PATENT DOCUMENTS

| | | | | |
|---|---|---|---|---|
| 5,093,787 A * | 3/1992 | Simmons | ...................... | 705/33 |
| 5,134,564 A * | 7/1992 | Dunn et al. | .................... | 705/33 |
| 5,689,579 A * | 11/1997 | Josephson | .................. | 382/137 |
| 5,842,185 A | 11/1998 | Chancey et al. | ............... | 705/40 |
| 5,918,216 A * | 6/1999 | Miksovsky et al. | ........... | 705/35 |
| 6,006,204 A * | 12/1999 | Malcolm | ..................... | 705/30 |
| 6,381,587 B1 * | 4/2002 | Guzelsu | ........................ | 705/40 |
| 6,496,838 B1 * | 12/2002 | Zamora-McKelvy et al. | ..... | 707/201 |
| 6,591,011 B1 * | 7/2003 | Nielsen | ....................... | 382/218 |
| 6,907,609 B1 * | 6/2005 | Kukura et al. | ................ | 719/316 |
| 7,062,456 B1 * | 6/2006 | Riehl et al. | .................... | 705/35 |
| 7,263,527 B1 * | 8/2007 | Malcolm | ..................... | 707/102 |
| 2001/0040989 A1 * | 11/2001 | Kovacs-Vajna | ............. | 382/125 |
| 2003/0191710 A1 * | 10/2003 | Green et al. | .................. | 705/40 |
| 2004/0205011 A1 * | 10/2004 | Northington et al. | .......... | 705/35 |

OTHER PUBLICATIONS

Kreminec, Kathleen E., "Reconciling the Automated Way.", Jan. 1990, Best's Review—Life-Health Insurance Edition, vol. 90, p. 82(3).*
From wayback maching: Internet Archive:http://web.archive.org/web/20000302192405/www.checkfree.com/financialservices/detail/0,1537,88,00.html. www.checkfree.com/financialservices/detail/0,1537,88,00.html.as of Mar. 2, 2000.*
www.checkfree.com found using www.archive.com's WayBack Maching. Page archived on Feb. 29, 2000.*

* cited by examiner

Primary Examiner—James P. Trammell
Assistant Examiner—J. Bradley Wright
(74) Attorney, Agent, or Firm—Osha • Liang LLP

(57) ABSTRACT

A system, method, and computer program product provide automated reconciliation of transactions. A transaction in a first list is reconciled with a combination of two or more transactions in a second list. A function, which may be implemented as a recursive function, successively searches for combinations of transactions in the second list in order to obtain a match for a transaction in the first list.

26 Claims, 4 Drawing Sheets

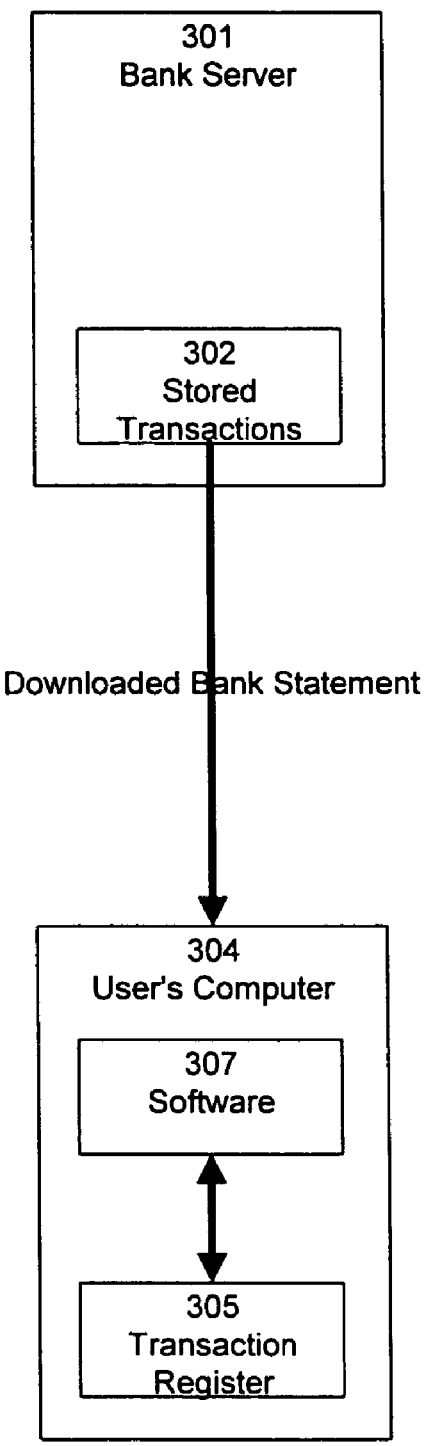
*FIG. 3A*  *FIG. 3B*

RECONCILING COMBINATIONS OF TRANSACTIONS

BACKGROUND OF THE INVENTION

1. Field of the Invention

The present invention relates generally to financial and investment software, and more particularly to a system, method, and computer program product for automated reconciliation between two differently recorded sets of transaction records.

2. Description of Background Art

Software for managing personal and/or business finances and investments typically provides functionality for reconciling a user-maintained transaction register with a statement provided by a bank or other financial institution. In conventional financial software applications, a reconcile function operates as follows. Upon receiving a statement from the financial institution, the user activates the reconcile function or mode, and specifies a closing date and ending balance for the statement. All transactions in the register are displayed, except those that have previously been cleared against prior statements. Transactions occurring after the closing date may be omitted or displayed differently from other transactions. The user is then given an opportunity to clear individual transactions in the register by matching them against transactions in the statement. Once the user has cleared all the transactions from the statement, software 307 compares the statement ending balance, adjusted for uncleared transactions, against the register ending balance. If necessary, and if requested by the user, an adjustment is made to the register. The reconciliation is then complete.

The above-described process entails substantial manual effort by the user. The user must manually review each transaction in the statement and check it against the list of register transactions. This process may be time-consuming and error-prone.

Accordingly, many financial software applications provide an automated reconciliation function, wherein the statement from the financial institution is retrieved (such as from an online source) and downloaded onto the user's computer. Software 307 then automatically compares the retrieved statement with the user-entered register. Software 307 attempts to match downloaded statement transactions with register transactions, by comparing the dates and amounts of the transactions, as well as payee or other descriptive information. Some software applications perform a "fuzzy" match determination, in order to allow for slight differences in dates, amounts, and other descriptive information. For example, such software applications may be able to detect a match between a $36.50 register transaction dated June 24$^{th}$ and a $36.60 statement transaction dated June 26$^{th}$ (thus accounting for bank processing time, inaccuracies in entry of data, and the like). In general, such software applications attempt to mimic the type of judgment call a human would make in performing manual reconciliation. In such software applications, the user may be queried as to whether to match a particular statement transaction against one of a limited group of register transactions (or vice versa), particularly when the "fuzzy" match determination algorithm fails to provide a definitive result.

In general, such prior art systems attempt to take into account discrepancies between user-entered transactions and corresponding bank-entered transactions. However, there are many circumstances in which these systems are not capable of identifying matches, despite the "fuzzy" match capability. In particular, in many situations the bank may combine several transactions that the user has entered separately. Conversely, the user-entered register may contain a combined transaction record reflecting several transactions that the bank has entered separately. Since in such situations the amounts for the transactions differ substantially between the user-entered register and the bank statement, the automated reconciliation function is not able to detect a match.

For example, a user may enter into the software two transactions on a particular date, representing a $457 deposit and a $213 deposit. In the bank's records, these transactions may be recorded as a single transaction in the amount of $670; this may occur, for example, if the user presented the items together when making the deposit at the bank. The above-described automated reconciliation function would fail to detect a match, since no single transaction in the register matches a transaction in the statement. This is undesirable, since the user would then have to manually indicate that these transactions should be cleared.

As another example, in an investment account, a register may record transactions representing user contributions, and may further record separate transactions representing an employer's matching contributions. The financial institution may record the user contribution and the employer contribution together, as a single transaction. Again, the above-described automated reconciliation function would fail to detect a match, since the financial institution's single transaction would not match any single transaction in the register.

What is needed, then, is a system, method, and computer program product for detecting matches between two lists of transactions, where one of the transaction lists contains a combined transaction representing two or more transactions in the other transaction list. What is further needed is an automated reconciliation system, method, and computer program product that is capable of recognizing matches between a combined transaction and separately recorded transactions. What is further needed is an automated reconciliation system, method, and computer program product that is capable of recognizing matches between different combinations of transactions.

SUMMARY OF THE INVENTION

The present invention reconciles transactions in transaction lists, and is able to detect combined transactions in one transaction list and match them appropriately with separately recorded transactions in another transaction list. The invention thus facilitates automated reconciliation between a user-maintained register and a downloaded statement from a financial institution, even when the register and the statement each combine transactions in different ways. The present invention is applicable to any software application or system having an automated reconciliation function, including for example personal finance software for tracking bank accounts and/or investment accounts.

The present invention further detects a match between a value in one list and a combination of values in a second list. The invention is thus applicable to other domains, systems, and environments in addition to automated reconciliation applications.

The invention determines whether, for two lists of values, a single value in the first list matches a combination (such as a sum) of values in the second list. In addition, the invention is able to perform many-to-many transaction matching, in which a combination of values in the first list matches a different combination of values in the second list.

In one embodiment, the invention employs a recursive function, which calls itself in order to successively eliminate individual values from the second list available for matching, until a matching combination is found, or until all possibilities are exhausted. Values may correspond, for example, to transaction amounts for a reconciliation application.

The present invention may be implemented together with a "fuzzy" transaction-matching scheme that detects matching transactions even when particulars of the transactions are not identical, such as for example transactions having slightly different dates or amounts.

BRIEF DESCRIPTION OF THE DRAWINGS

FIGS. 3A and 3B are block diagrams of one system architecture for practicing the present invention.

DETAILED DESCRIPTION OF THE PREFERRED EMBODIMENTS

Figure 1:
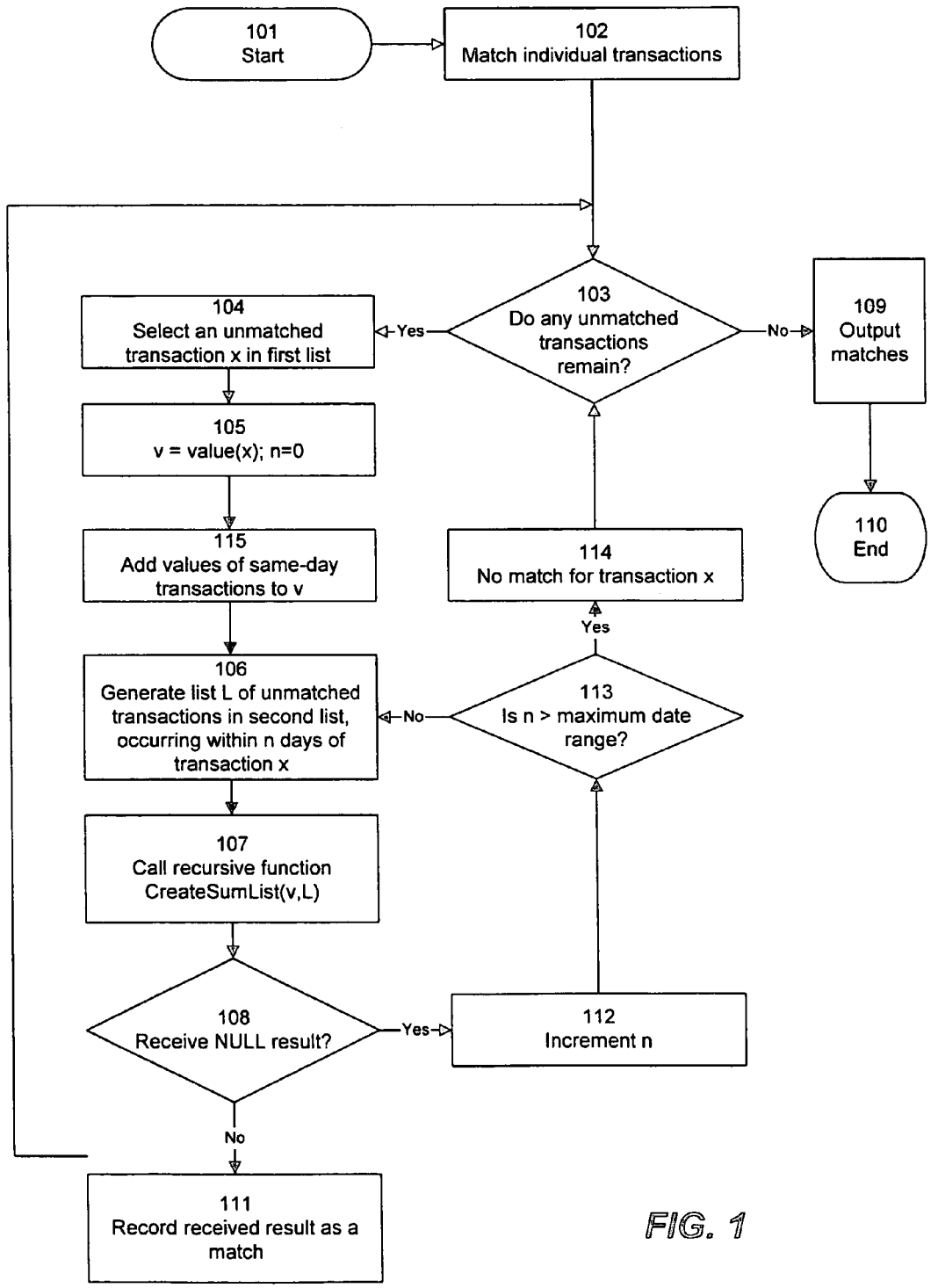
FIG. 1 is a flowchart of a method for matching transactions according to the present invention.

Referring now to FIGS. 3A and 3B, there are shown block diagrams depicting a system architecture for practicing the present invention.

In one embodiment, user's computer 304 runs software application 307 for entering and storing information describing various transactions. Examples of such a software application 307 include a personal finance software application, an accounting system, or an investment tracking application. Software application 307 is stored in memory (not shown), such as random-access memory (RAM), and executed by a processor (not shown) such as an Intel Pentium processor. Transaction information is stored on user's computer 304 in a transaction register 305, which may be stored, for example, on a hard drive or other medium. Transaction register 305 typically contains a number of transaction records that have been entered by the user, such as for example records of checks that have been written, deposits made, and the like.

In an alternative embodiment (not shown), software 307 for entering and storing the transactions may be provided at a remote server, such as bank server 301, with which the user's computer 304 communicates over a network such as the Internet. In such a server-based software application implementation, transaction register 305 may be stored at the remote server rather than on user's computer 304. The user may interact with the server-based software application using a browser or other means for communicating over the network. Alternatively, user-entered transactions may be temporarily stored on user's computer 304 and periodically uploaded to the remote server. Such server-based software and storage may be advantageous, for example, when the user may wish to access transaction register 305 from different computers at different times.

Periodically, the user may wish to reconcile transaction register 305, containing user-entered transactions, with a statement or listing of stored transactions 302. Such reconciliation is useful, for example, to determine whether a deposit was properly credited, or a check cashed by its payee. In an automated reconciliation scheme, user's computer 304 contacts a bank server 301 and downloads a subset of stored transactions 302 (constituting a downloadable bank statement) from server 301. Bank server 301 may be a remote computer, for example, containing records of transactions associated with many different customers. In alternative environments, server 301 may be associated with an investment firm or other financial institution. Stored transactions 302 represent those particular transactions associated with the user performing the reconciliation. The mechanisms and protocols for downloading transaction data are well known in the art (such as, for example, the Open Financial Exchange (OFX) protocol).

Software 307 then compares downloaded transactions 306 against user-entered transactions in register 305. Matching transactions are so indicated. Matches are detected by comparing, for example, amounts, reference numbers, dates, payee information, or any combination thereof. "Fuzzy" matching, taking into account slight discrepancies between the two sources of transaction information, may be employed. In some situations, register 305 may contain two or more transactions which, when combined, correspond to a single transaction in downloaded transactions 306. In other situations, the converse may be true, so that downloaded transactions 306 may contain two or more transactions which, when combined, correspond to a single transaction in register 305. As described in more detail below, the present invention detects such matches where transactions that may appear separately in one list are combined in the other.

One skilled in the art will recognize that the system architecture illustrated in FIGS. 3A and 3B is merely exemplary, and that the invention may be practiced and implemented using many other architectures and environments. For example, the present invention may be employed to match values between any two lists of transactions or other records, whether stored in the same location, entered by a user, or transmitted across a network.

Figure 4:
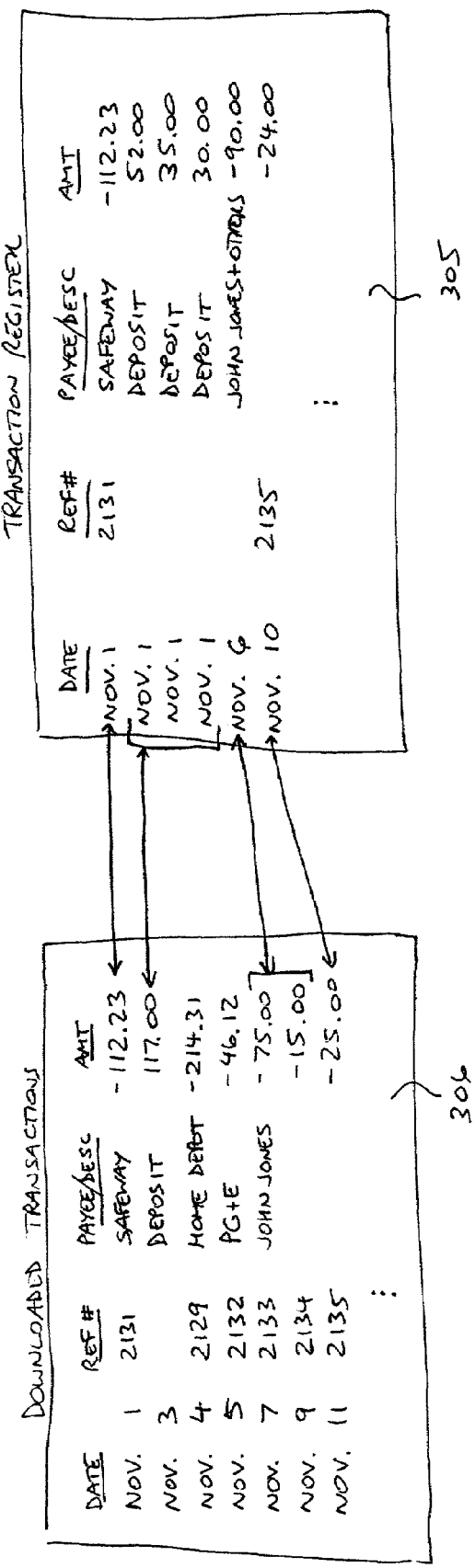
FIG. 4 is an example of a reconciliation operation.

Referring now to FIG. 4, there is shown an example of a reconciliation operation according to the present invention. Downloaded transactions 306 are reconciled against user-entered transaction register 305. If desired, transactions 306 may be limited to a particular subset of all recorded transactions, based on a date range. The particular fields shown in FIG. 4 for each recorded transaction include date, reference number, payee/description, and amount; other fields may be provided, such as category, comments, and the like. As can be seen from the example of FIG. 4, some transactions are reconciled by matching a combination of the stored fields. For example, transactions 306 include a Nov. 1 payment to Safeway, having a reference number of 2131 and an amount of $112.23. A transaction in register 305 has the same date, payee, reference number, and amount; therefore software 307 considers this transaction to be a match, and automatically reconciles it. Other methods and techniques for matching single transactions may also be applied, as will be apparent to one skilled in the art.

In some cases, some of the fields may have different information, or may be missing information entirely. Software 307 employs "fuzzy" matching by allowing for certain tolerances in the values stored in the various fields of the transaction records. For example, the Nov. 11 transaction having reference number 2135 and an amount of $25.00 (as recorded in transactions 306) is reconciled with a transaction in register 305 having a slightly different date of Nov. 10 and a slightly different amount of $24.00. Since the reference numbers correspond with one another, and since the difference in date and amount are relatively slight, the match is likely correct. The degree to which such variations are tolerated, and the interaction between different fields, may be predefined or user-adjustable. In particular, dates recorded in the user-entered transaction register 305 may not necessarily correspond with dates recorded in transactions 306, due to bank processing time; thus software 307 allows for a variation in the dates of recorded transactions. One skilled in the art will recognize that other similar techniques may also be employed.

In some cases, a downloaded transaction in 306 does not correspond to a single transaction in register 305, but does correspond to a combination of transactions in register 305. This may occur, for example, if the user enters two or more transactions separately, while the bank or financial institution's records show a single combined transaction representing the same activity as the two or more transactions entered by the user. For example, in FIG. 4 the three deposits indicated in register 305 as occurring on Nov. 1 were recorded separately by the user, but were combined into a single transaction (dated Nov. 3) in the bank's records 306. Accordingly, when software 307 fails to detect a match for a particular transaction in transactions 306, it searches for a combination of transactions in register 305 that matches the transaction in 306, in accordance with the methods of the present invention.

Conversely, a single transaction in register 305 may not correspond to a single transaction in 306, but may correspond to a combination of transactions in 306. This may occur, for example, if the user enters a combined transaction while the bank or financial institution's records show two or more distinct transactions representing the same activity as the single user-entered transaction. For example, in FIG. 4 the two checks dated Nov. 7 and Nov. 9 in transactions 305 were recorded separately by the bank, but were combined into a single transaction (dated Nov. 6) in the user-entered register 305. Accordingly, in one embodiment, the present invention may also search for a combination of transactions in 306 that matches a single transaction in register 305.

Referring now to FIG. 1, there is shown a flowchart of a method of matching such transactions according to one embodiment of the present invention. In one embodiment, the steps of FIG. 1 are performed by user's computer 304 or by a server computer, in accordance with stored instructions of software application 307. The actual location of execution of the steps of FIG. 1 is immaterial to the invention. For example, the present invention can be implemented as an automatic reconciliation feature in a personal finance software application, on an investment website, in an accounting application, and the like. In the following discussion, descriptions of the software or function performing particular steps of the invention are intended to refer to steps performed by some computer in accordance with the stored software instructions, or alternatively to refer to any automated scheme or technique for performing a series of steps.

The user initiates a reconciliation mode or feature. Software 307 then downloads or otherwise obtains a bank statement containing a list of transactions. Alternatively, if software 307 is running on bank server 301 the bank statement may already be available to software 307, in which case the user-maintained register is instead uploaded from user's computer 304. The list of transactions from the bank statement may be a subset of all transactions, based on date range, category, and the like. The list is reconciled with a user-maintained register, as follows.

Software 307 matches 102 individual transactions between the downloaded list and a second list derived from the user-maintained register. As described above, this step is performed by, for each transaction in one list, searching for a transaction having identical or similar recorded information in the other list. Once individual transactions have been matched, software 307 determines 103 whether any unmatched transactions remain. If no unmatched transactions remain, matches are output 109 (or marked as reconciled, as appropriate).

If software 307 determines 103 that unmatched transactions remain, it selects 104 an unmatched transaction in one of the transaction lists. The selected transaction is designated as "x" for purposes of the flowchart of FIG. 1, and the transaction list from which the transaction is selected is designated the "first list." (Thus, either the downloaded transaction list or the user-maintained register may be the first list.) The value of transaction x is stored 105 in variable v, and a counter n (representing a date range for determining matches) is initialized at zero. These designations and variable names are arbitrary, and are provided herein for illustrative purposes only.

In one embodiment, software 307 locates additional transactions occurring on the same day (or within a predefined time period) as transaction x, and adds 115 the values of any such transactions to v. Thus, v represents the total value of a number of transactions occurring on the specified day or within the predefined time period of the date of transaction x. In another embodiment, however, each such transaction is handled separately. Step 115 is not necessary to practice the present invention.

Software 307 then generates 106 a list L of unmatched transactions remaining in the second list, that occur within n days of transaction x. List L thus represents a set of candidate transactions that may, in some combination, match transaction x. As n is incremented in later steps (described below), the date range expands so that a larger list L of candidate transactions may be considered. However, the step of successively incrementing n to consider larger date ranges is not necessary to the present invention, and the invention may be practiced with only a single fixed date range, or with no date range at all.

Once value v and list L have been determined, software 307 calls 107 a recursive function (designated "CreateSumList"), using v and L as input to the function. The recursive function, whose operation is described in more detail below, searches list L for a set of transactions having values that, in combination, match value v. If a NULL result is received 108, no match was found. Software 307 then increments 112 the value of n, and determines 113 whether n exceeds a predefined maximum date range. If n does not exceed the date range, steps 106 through 108 are repeated with the new value of n. If n does exceed the date range, no match is found 114 for transaction x, and software 307 returns to step 103 to determine whether any unmatched transactions remain.

In one embodiment, if no unmatched transactions remain in the first list, but unmatched transactions remain in the second list, steps 104 through 108 may be repeated, reversing the designations of first and second list. In other words, if the designation of "first list" and "second list" are first applied to the user-entered register and the downloaded statement, respectively, this designation is reversed when the steps are performed for the second time. In this manner, transaction combinations in both lists can be detected and reconciled.

If in step 108, a result other than NULL is received, the received result is recorded 111 as a match. This received result indicates a set of transactions in the second list that, in combination, match transaction x; i.e., the transactions have values that add up to equal value v. In one embodiment, the set of transactions may equal or approximate value v, in accordance with a "fuzzy" matching scheme. Accordingly, software 307 may indicate that transaction x is reconciled, or matched, with the set of transactions received as a result of the recursive function.

Figure 2:
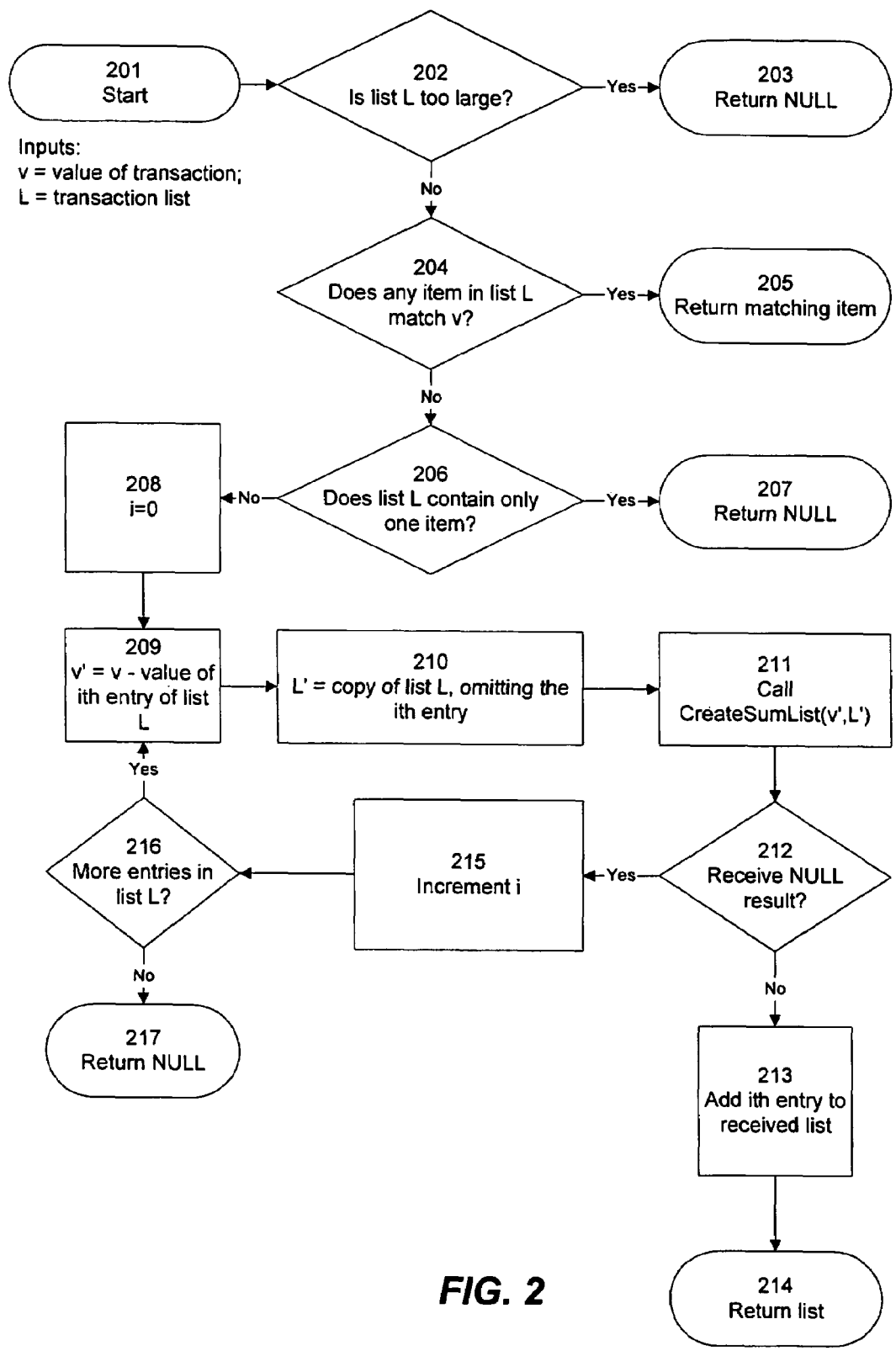
FIG. 2 is a flowchart of a recursive function.

Referring now to FIG. 2, there is shown a flowchart of a recursive function as called in step 107 of the above-described method. The function takes as input a value v of a transaction, and a transaction list L. If no match is found, the function returns a NULL value. If a match is found, the function returns a list containing either a single transaction that matches value v, or two or more transactions that, in combination, match value v.

In one embodiment, the function determines 202 whether list L is too large to be processed, and if so, returns 203 NULL.

The function then determines 204 whether any individual item in list L matches value v, and if so, returns 205 a list containing the matching item. In one embodiment, a "fuzzy" matching method may be employed in connection with step 204, so as to take into account slight differences in values or other transaction information, as is known in the art. In another embodiment, the "fuzzy" matching method is employed only if no matching list is found after the steps of FIG. 2 have been performed.

If, in 204, no item in list L matches value v, the function determines 206 whether list L contains only one item. If so, this item must not match v, and NULL is returned 207.

If, in 206, list L contains more than one item, the function sets 208 an index i to zero. The function then subtracts 209 the value of the $i^{th}$ entry of list L from v, and assigns this value to v'. It makes a copy 210 of list L, omitting the $i^{th}$ entry, and designates this list as L'.

The function then recursively calls itself 211, using v' and L' as input. In this way, the function removes one transaction from consideration, and searches for a match between the remaining transactions and a modified value that takes into account the removal of the transaction. If a non-NULL result is received 212, a match has been found between v' and some combination of transactions in L'. The $i^{th}$ entry, that was previously omitted from L', is added 213 to the list received from the recursive call. The list, including the added $i^{th}$ entry, is then returned 214.

If a NULL result is received in 212, the function increments 215. If more entries exist 216 in list L, steps 209 through 216 are repeated. If no more entries exist 216, a NULL result is returned 217.

Using a recursive function such as that described in connection with FIG. 2, the present invention successively traverses various combinations of transactions in order to find a match for reconciliation.

In an alternative embodiment, if two or more transactions in one of the lists remain unmatched, the above-described technique is applied to a combination of two or more remaining unmatched transactions. In this way, the invention can detect a match of two or more combined transactions in one list with a different combination of transactions in the other list. For example, a deposit of $20 combined with a deposit of $10 could be matched with two deposits of $15, since each combination yields a total deposit of $30.

From the above description, it will be apparent that the invention disclosed herein provides a novel and advantageous system and method for automated reconciliation between two sets of transaction records. The foregoing discussion discloses and describes merely exemplary methods and embodiments of the present invention. As will be understood by those familiar with the art, the invention may be embodied in other specific forms without departing from the spirit or essential characteristics thereof. For example, the present invention may be practiced with specific steps and techniques that differ from those depicted in FIGS. 1 and 2, such as for example employing a non-recursive function. Alternatively, other architectures and environments, including both networked and non-networked implementations, may be provided. Accordingly, the disclosure of the present invention is intended to be illustrative, but not limiting, of the scope of the invention, which is set forth in the following claims.

What is claimed is:

1. A computer-implemented method for reconciling a first transaction in a first list with a combination of at least two transactions in a second list, each transaction having a value, the method comprising:

obtaining the first transaction;

obtaining the second list of transactions;

determining whether the value of the first transaction corresponds to a combination of the values of a subset of transactions in the second list; and responsive to the value of the first transaction corresponding to the combination of values of the subset of transactions, indicating a match between the first transaction and the subset of transactions, wherein determining whether the value of the first transaction corresponds to a combination of the values of a subset of transactions in the second list comprises performing a recursive submethod using a first input parameter including the value of the first transaction and a second input parameter including the subset of transactions in the second list, and wherein performing the recursive submethod comprises:

responsive to one value of a transaction in the second input parameter equaling the first input parameter, returning a transaction list including the transaction having the one value, responsive to no values of transactions in the second input parameter equaling the first input parameter and the second input parameter containing only one transaction, returning an indicator that no match was found, and responsive to no values of transactions in the second input parameter equaling the first input parameter and the second input parameter containing more than one transaction, performing the recursive submethod using a modified first input parameter and a modified second input parameter, the modified second input parameter omitting a selected transaction and the modified first input parameter being obtained by subtracting the value of the selected transaction from the first input parameter.

2. The method of claim 1, wherein each transaction comprises one selected from a group consisting of an investment transaction, a financial transaction, and an accounting transaction.

3. The method of claim 1, wherein determining whether the value of the first transaction corresponds to the combination of the values of the subset of transactions in the second list comprises determining whether the value of the first transaction corresponds to a sum of the values of the subset of transactions in the second list.

4. The method of claim 1, wherein at least one of the steps of obtaining the first transaction and obtaining the second list comprises downloading transactions from a remote server.

5. The method of claim 1, wherein at least one of the steps of obtaining the first list and obtaining the second list comprises retrieving transactions from a storage device.

6. The method of claim 1, wherein performing the recursive submethod further comprises:

responsive to the recursive submethod returning the transaction list, adding the selected transaction to the returned transaction list to generate a modified transaction list, and returning the modified transaction list;

responsive to the recursive submethod returning the indicator that no match was found, performing the steps of:

responsive to any transactions remaining in the modified second input parameter, repeating the recursive submethod; and responsive to no transactions remaining in the modified second input parameter, returning the indicator that no match was found.

7. The method of claim 1, further comprising repeating the obtaining, determining, and indicating steps for a second transaction in the first list.

8. A computer-implemented method for matching a first value with a combination of at least two values in a list of values, the method comprising:
   obtaining the first value;
   obtaining the list of values;
   performing a recursive submethod, using a first input parameter including the first value and a second input parameter including the list of values, to determine whether the first value corresponds to a combination of values from the list of values; and
   responsive to the first value corresponding to the combination of values, indicating a match for the first values,
   wherein performing the recursive submethod comprises:
      responsive to one value in the second input parameter equaling the first input parameter, returning the list of values including the one value,
      responsive to no values in the second input parameter equaling the first input parameter and the second input parameter containing only one value, returning an indicator that no match was found, and
      responsive to no values in the second input parameter equaling the first input parameter and the second input parameter containing more than one value, performing the recursive submethod using a modified first input parameter and a modified second input parameter, the modified second input parameter omitting a selected value and the modified first input parameter being obtained by subtracting the selected value from the first input parameter.

9. The method of claim 8, wherein performing the recursive submethod further comprises:
   responsive to the recursive submethod returning the list of values, adding the selected value to the returned list of values to generate a modified value list, and returning the modified value list; and
   responsive to the recursive submethod returning the indicator that no match was found, performing the steps of:
      responsive to any values remaining in the modified second input parameter, repeating the recursive submethod; and
      responsive to no values remaining in the modified second input parameter, returning the indicator that no match was found.

10. The method of claim 8, wherein each value is associated with a transaction.

11. The method of claim 8, wherein the submethod determines whether the first value corresponds to a combination of values from the list of values.

12. A computer program product comprising a computer-usable medium having computer-readable code embodied therein for reconciling a first transaction in a first list with a combination of at least two transactions in a second list, each transaction having a value, comprising:
   computer-readable program code devices configured to cause a computer to obtain the first transaction;
   computer-readable program code devices configured to cause a computer to obtain the second list of transactions;
   computer-readable program code devices configured to cause a computer to determine whether a value of the first transaction corresponds to a combination of values of a subset of transactions in the second list; and
   computer-readable program code devices configured to cause a computer to, responsive to the value of the first transaction corresponding to the combination of values of the subset of transactions, indicate a match between the first transaction and the subset of transactions,
   computer-readable program code devices configured to cause a computer to perform a recursive submethod using a first input parameter including the value of the first transaction and a second input parameter including the subset of transactions in the second list, comprising:
      responsive to one value of a transaction in the second input parameter equaling the first input parameter, return a transaction list including the transaction having the one value,
      responsive to no values of transactions in the second input parameter equaling the first input parameter and the second input parameter containing only one transaction, return an indicator that no match was found, and
      responsive to no values of the transactions in the second input parameter equaling the first input parameter and the second input parameter containing more than one transaction, perform the recursive submethod using a modified first input parameter and a modified second input parameter, the modified second input parameter omitting a selected transaction and the modified first input parameter being obtained by subtracting the value of the selected transaction from the first input parameter.

13. The computer program product of claim 12, wherein each transaction comprises one selected from a group consisting of an investment transaction, a financial transaction, and an accounting transaction.

14. The computer program product of claim 12, wherein at least one of the computer-readable program code devices configured to cause a computer to obtain the first transaction and the computer-readable program code devices configured to cause a computer to obtain the second list of comprises computer-readable program code devices configured to cause a computer to download transactions from a remote server.

15. The computer program product of claim 12, wherein at least one of the computer-readable program code devices configured to cause a computer to obtain the first transaction and the computer-readable program code devices configured to cause a computer to obtain the second list comprises computer-readable program code devices configured to cause a computer to retrieve transactions from a storage device.

16. The computer program product of claim 12, wherein the computer-readable program code devices configured to cause a computer to perform the recursive submethod comprise computer-readable program code devices configured to cause a computer to:
   responsive to the recursive submethod returning the transaction list, adding the selected transaction to the returned transaction list to generate a modified transaction list, and returning the modified transaction list; and
   responsive to the recursive submethod returning the indictor that no match was found, performing the steps of:
      responsive to any transactions remaining in the modified second input parameter, repeating the recursive submethod; and responsive to no transactions remaining in the modified second input parameter, returning the indicator that no match was found.

17. A computer program product comprising a computer-usable medium having computer-readable code embodied therein for matching a first value with a combination of at least two values in a list of values, the computer program product comprising:
  computer-readable program code devices configured to cause a computer to obtain the first value;
  computer-readable program code devices configured to cause a computer to obtain the list of values;
  computer-readable program code devices configured to cause a computer to perform a recursive submethod, using a first input parameter including the first value and a second input parameter including the list of values, to determine whether the first value corresponds to a combination of values from the list of values; and
  computer-readable program code devices configured to cause a computer to, responsive to the first value corresponding to the combination of values, indicate a match for the first value,
  wherein the recursive submethod comprises:
    responsive to one value in the second input parameter equaling the first input parameter, return the list of values including the one value,
    responsive to none of the values in the second input parameter equaling the first input parameter and the second input parameter containing only one value, return an indicator that no match was found, and
    responsive to none of the values in the second input parameter equaling the first input parameter and the second input parameter containing more than one value, perform the recursive submethod using a modified first input parameter and a modified second input parameter, the modified second input parameter omitting a selected value and the modified first input parameter being obtained by subtracting the selected value from the first input parameter.

18. The computer program product of claim 17, wherein the computer-readable program code devices configured to cause a computer to perform the recursive submethod comprise computer-readable code devices configured to cause a computer to:
  responsive to the recursive submethod returning the list of values, adding the selected value to the returned list of values to generate a modified value list, and returning the modified value list; and
  responsive to the recursive submethod returning the indicator that no match was found, performing the steps of:
    responsive to any values remaining in the modified second input parameter, repeating the recursive submethod; and
    responsive to no values remaining in the modified second input parameter, returning the indicator that no match was found.

19. The computer program product of claim 17, wherein each value is associated with a transaction.

20. A system for reconciling a first transaction in a first list with a combination of at least two transactions in a second list, each transaction having a value, the system comprising:
  a first input device, for obtaining the first transaction;
  a second input device, for obtaining the second list of transactions;
  coupled to the first and second input devices, a memory for storing the first transaction and the second list;
  coupled to the memory, a match determination module for determining whether the value of the first transaction corresponds to a combination of the values of a subset of transactions in the second list; and
  coupled to the match determination module, a match indication module for, responsive to the value of the first transaction corresponding to the combination of values of the subset of transactions, indicating a match between the first transaction and the subset of transactions,
  wherein the match determination module performs a recursive submethod using a first input parameter including the value of the first transaction and a second input parameter including the subset of transactions in the second list, and
  wherein the recursive submethod comprises:
    responsive to one value of a transaction in the second input parameter equaling the first input parameter, returning a transaction list including the transaction having the one value,
    responsive to no values of transactions in the second input parameter equaling the first input parameter and the second input parameter containing only one transaction, returning an indicator that no match was found, and
    responsive to no values of transactions in the second input parameter equaling the first input parameter and the second input parameter containing more than one transaction, performing the recursive submethod using a modified first input parameter and a modified second input parameter, the modified second input parameter omitting a selected transaction and the modified first input parameter being obtained by subtracting the value of the selected transaction from the first input parameter.

21. The system of claim 20, wherein each transaction comprises one selected from a group consisting of an investment transaction, a personal financial transaction, and an accounting transaction.

22. The system of claim 20, wherein the match determination module determines whether the value of the first transaction corresponds to the sum of the values of the subset of transactions in the second list.

23. The system of claim 20, wherein the recursive submethod further comprises:
  responsive to the recursive submethod returning the transaction list, adding the selected transaction to the returned transaction list to generate a modified transaction list, and returning the modified transaction list; and
  responsive to the recursive submethod returning the indicator that no match was found, performing the steps of:
    responsive to any transactions remaining in the modified second input parameter, repeating the recursive submethod; and
    responsive to no transactions remaining in the modified second input parameter, returning the indictor that no match was found.

24. A system for matching a first value with a combination of at least two values in a list of values, the system comprising;
  a first input device, for obtaining the first value;
  a second input device, for obtaining the list of values;
  coupled to the first input device and the second input device, a memory for storing the first value and the list of values;
  coupled to the memory, a recursive function module, for performing a recursive function, using a first input parameter including the first value and a second input parameter including the list of values, to determine whether the first value corresponds to a combination of values from the second list; and coupled to the recursive function module, a match indicator for, responsive to the first value corresponding to the combination of values, indicating a match for the first value, wherein the recursive function module:
- responsive to one value of a transaction in the second input parameter equaling the first input parameter, returns a transaction list including the transaction having the one value,
- responsive to no values of transactions in the second input parameter equaling the first input parameter and the second input parameter containing only one transaction, returns an indicator that no match was found, and
- responsive to no values of transactions in the second input parameter equaling the first input parameter and the second input parameter containing more than one transaction, performs the recursive submethod using a modified first input parameter and a modified second input parameter, the modified second input parameter omitting a selected value and the modified first input parameter being obtained by subtracting the selected value from the first input parameter.

25. The system of claim 24, wherein the recursive function module:
- responsive to the recursive submethod returning the transaction list, adding the selected value to the returned transaction list to generate a modified transaction list, and returning the modified transaction list; and
- responsive to the recursive submethod returning the indicator that no match was found, performing the steps of:
  - responsive to any values remaining in the modified second input parameter, repeating the recursive submethod; and
  - responsive to no values remaining in the modified second input parameter, returning the indicator that no match was found.

26. The system of claim 24, wherein each value is associated with a transaction.

* * * * *

UNITED STATES PATENT AND TRADEMARK OFFICE
CERTIFICATE OF CORRECTION

| | | |
|---|---|---|
| PATENT NO. | : 7,403,917 B1 | Page 1 of 1 |
| APPLICATION NO. | : 09/534201 | |
| DATED | : July 22, 2008 | |
| INVENTOR(S) | : David R. Larsen | |

It is certified that error appears in the above-identified patent and that said Letters Patent is hereby corrected as shown below:

In Claim 23, column 12 (line 53), insert --steps-- after "method".

Signed and Sealed this

Seventh Day of October, 2008

JON W. DUDAS
*Director of the United States Patent and Trademark Office*